United States Patent
Luo et al.

(10) Patent No.: US 9,463,430 B2
(45) Date of Patent: Oct. 11, 2016

(54) MAGNETICALLY INDUCTIVE SLURRY BUBBLE COLUMN REACTOR

(71) Applicants: Shenhua Group Corporation Limited, Beijing (CN); National Institute of Clean-and-Low-Carbon Energy, Beijing (CN)

(72) Inventors: Mingsheng Luo, Beijing (CN); Qiang Miao, Beijing (CN); Jaiqing Zhu, Beijing (CN)

(73) Assignees: National Institute of Clean-and-Low-Carbon Energy, Beijing (CN); Shenhua Group Corporation Limited, Beijing (CN)

( * ) Notice: Subject to any disclaimer, the term of this patent is extended or adjusted under 35 U.S.C. 154(b) by 69 days.

(21) Appl. No.: 14/380,635

(22) PCT Filed: Jan. 15, 2013

(86) PCT No.: PCT/CN2013/070462
§ 371 (c)(1),
(2) Date: Dec. 29, 2014

(87) PCT Pub. No.: WO2013/123836
PCT Pub. Date: Aug. 29, 2013

(65) Prior Publication Data
US 2015/0182929 A1    Jul. 2, 2015

(30) Foreign Application Priority Data

Feb. 24, 2012    (CN) .......................... 2012 1 0044900

(51) Int. Cl.
*B01J 8/42*        (2006.01)
*B01J 8/22*        (2006.01)
*C10G 2/00*        (2006.01)
*B01J 8/00*        (2006.01)
*B01J 8/06*        (2006.01)

(52) U.S. Cl.
CPC    *B01J 8/42* (2013.01); *B01J 8/005* (2013.01); *B01J 8/06* (2013.01); *B01J 8/22* (2013.01); *C10G 2/32* (2013.01); *C10G 2/342* (2013.01); *C10G 2/35* (2013.01); *B01J 2208/024* (2013.01)

(58) Field of Classification Search
CPC .......... B01J 8/42; C10G 2/342; C10G 2/343; C10G 2/344
See application file for complete search history.

(56) References Cited

U.S. PATENT DOCUMENTS 3,440,731 A * 4/1969 Tuthill ........................ B01J 8/42
                                                         148/103
4,296,080 A    10/1981 Rosensweig
4,536,380 A *  8/1985 Pirkle, Jr. ............ C07D 301/10
                                                         423/359

FOREIGN PATENT DOCUMENTS

CN    1152605 A     6/1997
CN    101913680 A   12/2010

OTHER PUBLICATIONS

Zhiyong Pan et al., Integration of Magnetically Stabilized Bed and Amorphous Nickel Allow Catalyst for CO Methanation; Abtract; http://www.sciencedirect.com/science/article/pii/S0009250907001625; Dec. 18, 2014.
International Search Report corresponding application PCT/CN2013/070462 dated Apr. 2, 2013 with translation.
Written Opinion of corresponding application PCT/CN2013/070462 dated Apr. 2, 2013 with translation.

* cited by examiner

*Primary Examiner* — Lessanework Seifu
(74) *Attorney, Agent, or Firm* — Senniger Powers LLP

(57) ABSTRACT

A magnetically assisted slurry bubble column reactor. A gas-liquid-solid three-phase stream is subjected to a reaction in the reactor, and a magnetic field generator generates inside the reactor a magnetic field in a direction opposite to the flow direction of the reaction streams. A catalyst inside the reactor is sensitive to the magnetic field. The field imparts a magnetic force on said catalyst offsetting the driving force of the flowing gas-liquid-solid three-phase reaction streams, so as to allow the catalyst to be present in a relatively static state inside the reactor with other reaction streams present in a flowing state. The magnetically assisted slurry bubble column reactor in the present invention can be used in a Fischer-Tropsch reaction.

13 Claims, 1 Drawing Sheet a. Low Intensity
$H = 532.38$ A/m b. Medium Intensity
$H = 3194.26$ A/m c. High Intensity
$H = 6388.52$ A/m

MAGNETICALLY INDUCTIVE SLURRY BUBBLE COLUMN REACTOR

TECHNICAL FIELD

The present invention covers a magnetically assisted slurry bubble column reactor, and especially to a three-phase magnetically assisted slurry bubble column reactor useful in the Fischer-Tropsch synthesis for greatly reduced attrition of catalyst particles inside a three-phase bubble-column Fischer-Tropsch reactor.

BACKGROUND ART

The Fischer-Tropsch reaction refers to the reaction of converting a syngas ($H_2$+CO) into hydrocarbons and other chemicals in the presence of a catalyst at certain temperature under certain pressure. In recent years, with the decreasing petroleum resources and constantly increasing price of crude oils, Fischer-Tropsch synthesis has aroused a worldwide interest among energy researchers. Generally speaking, the Fischer-Tropsch synthesis process can be represented by the following formulae:

$$mCO + (2m+1)H_2 \rightarrow C_mH_{2m+2} + mH_2O \quad (1)$$

$$mCO + 2mH_2 \rightarrow C_mH_{2m} + mH_2O \quad (2)$$

$$2mCO + (m+1)H_2 \rightarrow C_mH_{2m+2} + mCO_2 \quad (3)$$

The Fischer-Tropsch reaction is typically carried out in a Fischer-Tropsch reactor, which can be a fixed-bed reactor or a slurry bubble column reactor (SBCR). Since the fixed-bed reactor is more expensive than the slurry bubble column reactor, and Fischer-Tropsch reaction is an exothermic reaction whose reaction temperature can hardly be controlled, the slurry bubble column reactor is advantageous over the fixed-bed reactor.

There is no doubt that the slurry bubble column reactor has many advantages over the other reactors, and draws increasing attention from the public. As a gas-liquid-solid multiphase reactor, the slurry bubble column reactor (SBCR) has the advantages of simple structure, large liquid holdup, small temperature gradient, large heat capacity, satisfactory heat transfer performance, easy to control the temperature, easy to treat solid particles and low operating cost.

However, the catalyst in the slurry bubble column reactor is seriously abraded, so that there are a quantity of the fine powders or dusts of the catalyst in the liquid product and it is rather difficult to separate the fine powders from the liquid product, which undoubtedly increases the complexity and operating cost of the industrial Fischer-Tropsch synthesis reactor. Moreover, the broken catalyst particles usually cause the forced shutdown of the subsequent filtration apparatus, such that the running period of the whole system may be sharply shortened.

In fact, in the slurry bubble column reactor, the turbulent fluid movement of gas-liquid-solid three-phase reaction streams are rather strong, including the motions of large bubbles, small bubbles, and the slurry and catalyst particles. Different stream exhibit different hydrodynamic characteristics, such as advection, eddy current and turbulence, in different regions. Meanwhile, cooling tubes and other structures inside the reactor can cause the solid catalyst particles to break up at a rather rapid speed through collision and friction in such a fluid environment. In most cases, after a period of time, the particle size thereof will be reduced from the dozens of microns to in the beginning to sub-microns fine powders.

The magnetic force formed by the magnetic field is increasingly applied to mixing, separating, filtrating, or even steady flowing of the multiphase streams. For example, U.S. Pat. No. 3,219,318 discloses a fluid-stirring apparatus, wherein there are many non-spherical permanent magnet parts distributed in the fluid, and the periphery of the fluid is provided with a magnetic field with alternating intensity and alternative direction to enable the aforesaid non-spherical permanent magnet parts to be involved in rotation and parallel displacement in the fluid, so as to achieve the object of stirring the fluid.

US2010/0113622 discloses a system for separating liquids from solids comprising an immobilization unit comprising an immobilization vessel containing a bed of magnetizable material and a magnet configured to produce a magnetic field within the immobilization vessel, wherein the immobilization vessel further comprises an immobilization vessel outlet and an immobilization vessel inlet for a fluid comprising liquid and metal-containing particles. When the fluid comprising a liquid and the magnetic solid particles flows through the aforesaid immobilization vessel, most of the solid particles in the fluid are removed in the bed of magnetizable material. The aforesaid system may be used to separate liquid from solid catalyst particles and may be particularly applied in multi-phase catalytic reactors where the catalyst comprises magnetic solids particles, for example, in the removal or filtration of the residual catalyst particles comprised in the liquid product in the Fischer-Tropsch (FT) reactors.

U.S. Pat. No. 4,296,080 discloses a fluidized bed process for removing impurity particles from the fluid, wherein the fluidized bed is a moving controllable particle trap bed, comprising magnetic particles. The fluidized bed is extended and lifted by the fluid streams, and can be controllably moved according to the pressure differential of the fluidized bed, wherein at least part of the region in the fluidized bed is applied with a magnetic field wherein the major magnetic component is in the so-called direction of the external force field. The magnetic field intensity has to be sufficient for suppressing the solid backmixing and fluid shunt appearing in the fluidized bed, but less than the value weakening the fluid characteristics of the fluidized bed. When the fluid containing magnetic impurity particles passes through the aforesaid particle trap bed, most of the impurity particles are trapped and removed.

US Re. 31186 discloses a fluidized bed process for hydrocarbon conversion, wherein the fluidized bed comprises the magnetic and fluidizable composite particles having the catalytic activity towards the conversion of hydrocarbons, as well as 2-40 vol % of iron or iron magnetic materials. A constant and substantially uniform magnetic field is applied to the aforesaid fluidized bed along the direction of gravity to allow the composite particles to have a magnetic force along the direction of gravity, and allow the fluidized gaseous medium comprising the gasifying hydrocarbon feed to pass through the fluidized bed upwardly at an apparent velocity which is greater than at least 10% of the conventional minimum value of the apparent gas velocity required by the fluidized bed when the magnetic field is not applied, but less than the apparent gas velocity required by the fluctuations of the pressure differential as time changed when passing through said fluidized bed within the interval of 0.1 to 1 second with the magnetic field applied. The aforesaid fluidized bed enables the fluidized state of each stream to be present in a stable and homogenous condition, and especially to eliminate the generation of large bubbles in the fluidized bed.

To sum up, when a slurry bubble column reactor is used in the Fischer-Tropsch reaction, how to avoid the serious attrition of catalyst particles and to highly effectively separate the catalyst fine powders or dusts from the liquid product is a serious process issue troubling the industry for a long time without a satisfactory solution so far.

Based on intensive research, on the fluid hydrodynamics inside the slurry bubble column reactor and the mechanism of the electromagnetic field, the inventor successively developed a magnetically assisted slurry bubble column reactor suitable for the Fischer-Tropsch reaction and capable of sharply reducing the attrition of catalyst particles in the Fischer-Tropsch reaction. The magnetically assisted slurry bubble column reactor in the present invention can be used to resolve the problem of liquid-solid filtration in a three-phase Fischer-Tropsch reactor, and to enhance the mass transfer between the catalyst particles and reactant gases as well as the service life of the catalyst.

CONTENTS OF THE INVENTION

The present invention provide a magnetically assisted slurry bubble column reactor, comprising a three-phase slurry bubble column reactor, and a magnetic field generator for generating a magnetic field inside the reactor in a direction opposite to the flowing direction of the reaction streams, wherein at least part of the solid-phase reaction stream is the catalyst sensitive to the magnetic field, wherein a magnetic force caused by the magnetic field towards said catalyst offsets the driving force of the flowing gas-liquid-solid three-phase reaction streams to the said catalyst, so as to allow the catalyst to be present in a relatively static state inside the reactor with other reaction streams being in a flowing state.

Typically, said magnetic field generator may be at least one coil through which the direct current or alternating current flows and which surrounds said reactor; preferably, the magnetic field intensity varies along with the longitudinal direction of the reactor or the direction in which the reaction streams flow; more preferably, the magnetic field intensity has a maximum value at the outlet of the liquid reaction stream; for example, the magnetic field intensity is in the range of from 2000 to 7000 A/m at the outlet of the liquid reaction stream, and in the range of from 300 to 2000 A/m in other regions; said reaction streams comprise the reactants and reaction products, in addition to the catalyst particles inside the reactor.

In particular, the magnetically assisted slurry bubble column reactor of the present invention is suitable for the Fischer-Tropsch reaction, and the catalyst in this case is a Fischer-Tropsch reaction catalyst which may be the particles of magnetic materials or composite particles having the magnetic material as the core; examples of such catalyst include the metal catalyst, metal oxide catalyst, and/or metal carbide catalyst, such as, Fe, Co, Ni, Ru, Rh and/or oxides or carbides thereof.

EMBODIMENTS

Figure 1:
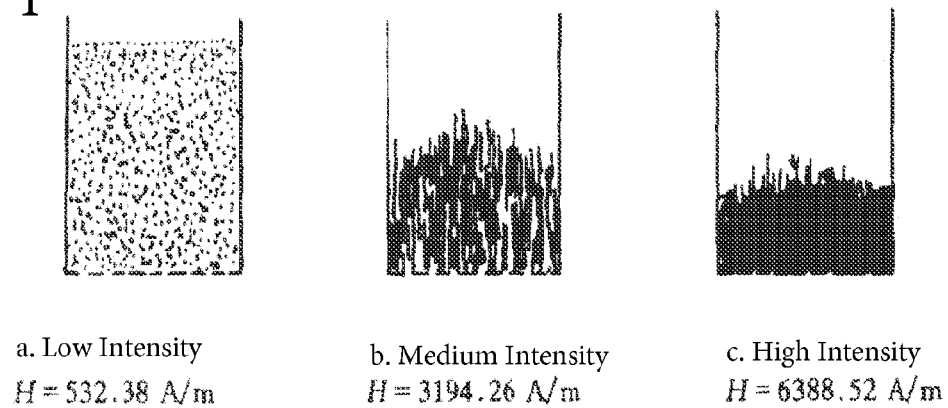
FIG. 1 shows the distribution state of the magnetic solid particles in the gas-liquid-solid three-phase reaction streams under the action of low-intensity, medium-intensity, and high-intensity magnetic field.

The present invention is further disclosed in detailed by the following reference figures, but the following description is merely used for the person skilled in the art to clearly figure out the mechanism and essence of the present invention, without any form of limitation to the present invention. The identical or corresponding parts of features in the figures are represented by the same number markers.

When the slurry bubble column reactor is used in the Fischer-Tropsch reaction, there are many causes resulting in the rapid attrition of the catalyst particles of Fischer-Tropsch reaction, including the abrasion caused by the collision between the catalyst particles and the metal cooling tubes and other internal metal structures, or caused by the friction and collision among catalyst particles or among catalyst and gas-phase and liquid-phase streams in different flowing states, e.g., advection, eddy current and turbulence, or the abrasion caused when the catalyst particles are separated from the liquid product. However, whatsoever, these abrasions are mainly caused by the motion or displacement of the catalyst particles as the gas-liquid-solid three-phase reaction streams flow. If the catalyst particles can be kept in a relatively static state while other reactant streams or product streams flow without any restriction, the attrition between catalyst and metal internals thereof will be eliminated or reduced to the lowest level.

It is widely known that the flowing gas-liquid-solid three-phase reaction streams will have certain driving force towards the catalyst particles therein, and such driving force will impel the catalyst particles to be passively involved in motion or displacement. If the catalyst particles are present in a relatively static condition during the running of the reactor, an external force is necessary to neutralize the aforesaid driving force. When the gas-liquid-solid three-phase reaction streams are flowing upwardly, although the catalyst particles have gravity, yet gravity is not enough to offset this driving force, or even gravity can be neglected as compared with the aforesaid driving force and movement inertia.

It is noticed that many catalyst particles are magnetizable or are intrinsically magnetic. Even for the catalysts without magnetic properties, they can be endowed with the magnetic property by forming composite particles having the magnetic material as the core by means of the currently well known coating technique. It is found out by extensive experimentation and theoretical analysis that the external force capable of effectively offsetting the driving force generated by the flowing gas-liquid-solid three-phase reaction streams towards the catalyst particles is the magnetic force generated by the catalyst particles in the direction opposite to the aforesaid driving force when the external magnetic field is applied.

The aforesaid technical analysis is a theoretical basis for carrying out the present invention. However, the environment in which the catalyst particles are present in the flowing gas-liquid-solid three-phase reaction streams is so complicated that the driving force of the flowing three-phase reaction streams towards the catalyst particles may differ with the different time and location, and thus the magnetic force counteracting the aforesaid driving force is also required to be varied correspondingly as the time and location changes. Especially, the catalyst particles are distributed in the gas-liquid-solid three-phase reaction streams differently in the presence and absence of the external magnetic field. Under the action of the low-intensity, medium-intensity, and high-intensity magnetic field, the magnetic solid catalyst particles are also distributed in different states in the gas-liquid-solid three-phase reaction streams.

FIG. 1 shows the distribution state of the magnetic solid particles in the gas-liquid-solid three-phase materials under the action of the low-intensity, medium-intensity, and high-intensity magnetic field. As shown in FIG. 1, with a low-intensity magnetic field (with a magnetic field intensity of H=532.38 A/m), the magnetic solid particles, in particular the particles with a relatively small particle size, e.g., with a particle size less than 150 μm, are uniformly and homogeneously distributed in the gas-liquid-solid three-phase materials, that is, present in a loose particulate state. For the catalyst particles, this is the most ideal state of distribution, which can not only guarantee the uniform and homogenous distribution of the catalyst particles in the gas-liquid-solid three-phase materials to facilitate the catalytic reaction. This also help the catalyst particles be kept relatively static or slightly drifted when the gas-liquid-solid three-phase materials is present in a flowing condition, due to the relatively small resistance generated by the catalyst particles towards the flowing motion. With a medium-intensity magnetic field (with a magnetic field intensity of H=3194.26 A/m), the magnetic solid particles are distributed directionally in the gas-liquid-solid three-phase materials, that is, present in a chain-type state. In this case, the magnetic solid particles are not distributed uniformly and homogenously in the gas-liquid-gas three-phase materials. When the magnetic solid particles are the catalyst particles, it is difficult for them to be kept relatively static in the flowing gas-liquid-solid three-phase materials, because the catalyst particles have a relatively large resistance to the flowing motion, and such a state in not preferred for a catalytic reaction due to the inhomogeneous distribution of the catalyst particles. With a high-intensity magnetic field (with a magnetic field intensity of H=6388.52 A/m), the magnetic solid particles are distributed aggregately in the gas-liquid-solid three-phase materials, that is, present in a state of magnetic agglomeration. In this state, the magnetic solid particles are distributed in the gas-liquid-solid three-phase materials in the most inhomogeneous condition. When the magnetic solid particles are the catalyst particles, they cannot be kept relatively static when the gas-liquid-solid three-phase materials flows, because the resistance of the catalyst particles towards the flowing motion reaches the largest level, and this state is most disadvantageous for the progression of the catalysis. Thus, in the magnetically assisted slurry bubble column reactor of the present invention, aside from the outlet of liquid stream, the catalyst should be avoided as much as possible being distributed in a chain-type state and magnetic-agglomeration state in the gas-liquid-solid three-phase reaction materials, and maintained in the loose particulate condition to the greatest extent.

When the gas-liquid-solid three-phase materials are present in a flowing state, in order to achieve the relative static state of the catalyst particles, factors, other than magnetic field intensity, need to be considered, such as, size, morphology and density of the catalyst particles, viscosity and flow velocity of the liquid-phase reaction stream, solids content, gas content, formation amount of the large bubbles, form of the fluid flow and the like. Only when the aforesaid factors are combined and act together with the external magnetic field intensity to form a force offsetting the driving force of the very flowing gas-liquid-solid three-phase reaction streams towards the catalyst particles, the relative static state of catalyst particles can be achieved.

Figure 2:
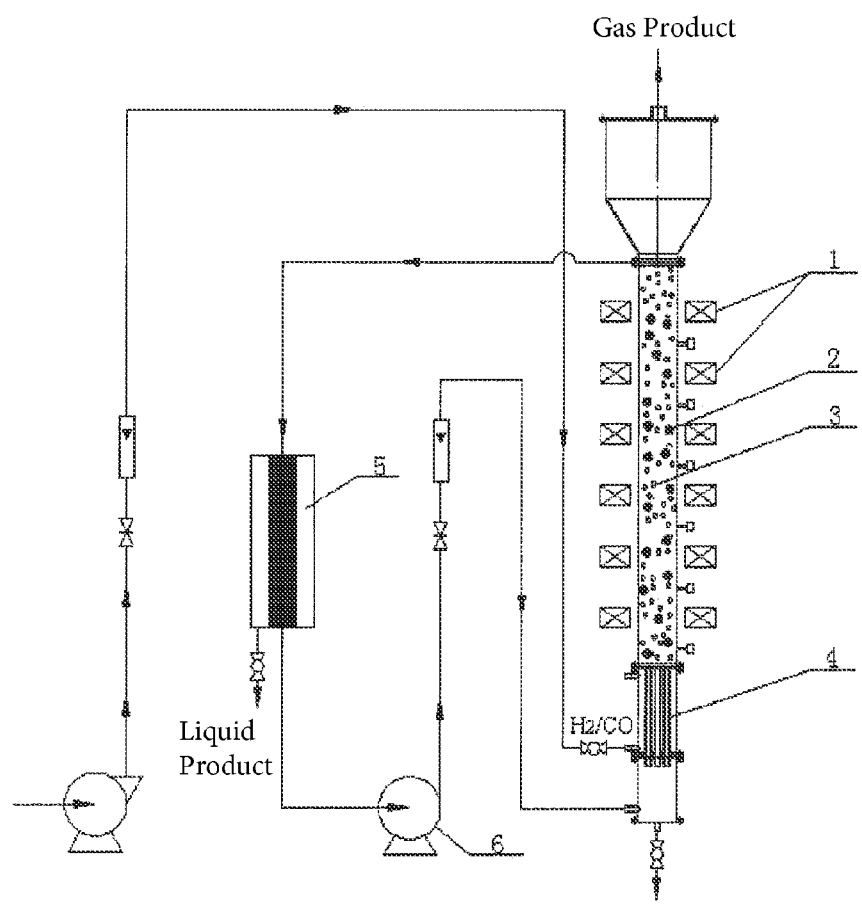
FIG. 2 is a schematic diagram of the structure of the magnetically assisted slurry bubble column reactor of the invention.

FIG. 2 shows the structure of the magnetically assisted slurry bubble column reactor of the invention. As shown in FIG. 2, said reactor is structured as a column, in which syngas materials, i.e., $H_2$ and CO, enter the reactor from the bottom of the column, while the gas/steam product and liquid product exit the reactor from the top of the column. After the liquid product is withdrawn from the reactor, it is fed into a conventional solid-liquid separator, e.g., a membrane filter for the liquid/solid phase separation.

In this magnetically assisted slurry bubble column reactor of the invention, $H_2$ and CO are fed into the reactor from the bottom via the stream distributor 4, to form large and small bubbles 3 with different diameters in the liquid phase; meanwhile, there are magnetic solid catalyst particles 2 uniformly distributed in the reactor. With the function of the catalyst particles 2, the gas-liquid-solid three-phase streams are subjected to a chemical reaction in the reactor, wherein the reaction streams comprising the reactants and reaction products flow upwardly, and are finally withdrawn from the reactor via the outlet on the top of the column (including the liquid stream outlet and the gas stream outlet).

In order to reduce the attrition of catalyst particles 2 to the greatest extent, at least one external magnetic field 1 is provided outside the reaction column. In view of the aforesaid other factors, the intensity of the external magnetic field should have the catalyst particles 2 to be uniformly distributed in the gas-liquid-solid three-phase reaction materials, and kept relatively static when the gas-liquid-solid three-phase reaction materials flow, i.e., most ideally kept in the loose particulate state as shown in FIG. 1, which is the most satisfactory state, making it possible that the abrasion of catalyst particles 2 can be reduced to the largest degree, and thus improve the overall catalytic reaction. Although the catalyst particles 2 are kept in a relatively static state as far as possible when the gas-liquid-solid three-phase reaction materials are present in a flowing condition, yet since the hydrodynamics of the flowing gas-liquid-solid three-phase reaction materials in the slurry bubble column reactor is so complicated that the reaction streams have different flowing situation and distribution state in different regions or even in the same region at different time points. It is impossible to completely avoid the motion or displacement of catalyst particles 2 sometimes.

In order to guarantee all of, at least most of the catalyst particles 2 at the top part of the reactor in a relatively static state or in a merely slightly drifted state, it is preferred that the intensity of the external magnetic field is variable along the longitudinal direction (axial direction) of the reactor or along the flowing direction of the reaction materials, or in certain fixed region or even in all the regions of the reactor, the magnetic field intensity may also vary as time goes by or the running state of the reactor changes. This practice is proved advantageous in the following aspect: when the magnetic solid catalyst particles tend to be moved or displaced, for instance, heavily drifted, it means the magnetic force conferred by the external magnetic field on the catalyst particles has been unbalanced with the driving force of the flowing gas-liquid-solid three-phase reaction materials on the catalyst particles. For a purpose of restoring balance, the magnetic force for the catalyst particles may be increased or decreased by changing the magnetic field intensity.

Under some circumstances, if the operating parameters of the reactor fail to reach a good coordination, there may be very few catalyst particles 2 be entrained into the liquid product. In order to avoid this case, as shown in FIG. 2, after leaving the magnetically assisted slurry bubble column reactor of the invention, the liquid product may subsequently enter the conventional solid-liquid separator 5 to separate a small number of the entrained catalyst particles from the liquid product. These separated catalyst particles are recycled into the reactor from the lower part or bottom of the reactor via a feeding device, such as, blower 6, so as to make up the loss of catalyst particles.

It is well known that any catalyst has a limited service life. When the deactivated catalyst particles 2 in the reactor has reached the service life, fresh makeup catalyst is required. In this case, it is necessary to purposely remove the external magnetic field. After the magnetic force conferred by the external magnetic field on the catalyst particles disappears, the spent catalyst particles driven by the flowing gas-liquid-solid three-phase reaction streams leave the reactor, while the fresh catalyst particles enter the reactor from the lower part or bottom of the reactor via a feeding device, and redistributed uniformly and homogenously in the gas-liquid-solid three-phase reaction materials, so as to replace the deactivated spent catalyst in-line.

According to the present invention, the generator producing an external magnetic field is a coil through which the direct current or alternating current flows and which surrounds the reactor, and there may be one, but preferably multiple such magnetic field generating coils, making it possible for the magnetic field intensity to be differently distributed in different regions of the reactor, so as to determine the different magnetic field intensity according to the operating parameters of the reactor as well as the hydrodynamics of the gas-liquid-solid three-phase reaction materials in different regions of the reactor. The maximum magnetic field intensity may be set up at the outlet of the liquid reaction stream, i.e., at the top of the reactor. Thus, even if the catalyst particles 2 drift to some extent when the gas-liquid-solid three-phase reaction materials flow, when reaching the outlet of the liquid reaction stream, the catalyst particles 2 are unable to escape the reactor along with the liquid product under the control of the magnetic force in a direction opposite to the fluid stream flow direction. Other reaction streams, such as, gas or vapor products, liquid products and residual reactants can be smoothly withdrawn from the reactor. Moreover, as long as the catalyst particles 2 stay inside the reactor, it is possible to retain the catalyst particles 2 for better particle distribution by adjusting the magnetic field intensity.

To achieve the aforesaid goal, the magnetic field intensity at the outlet of the liquid reaction materials may be 1000-1000 A/m, but preferably 2000-7000 A/m; and 100-3000, but preferably 300-2000 A/m in other regions. The final magnetic field intensity depends on the operating parameters of the reactor, properties of the reactants and reaction products, as well as the flowing state of the gas-liquid-solid three-phase reaction materials.

The magnetically assisted slurry bubble column reactor of the present invention is particularly applicable to the Fischer-Tropsch reaction, and more particularly applicable to the Fischer-Tropsch synthesis reaction system in which the catalyst particles are magnetizable solid particles. Examples of such catalysts are metal catalysts, metal oxide catalysts and/or metal carbide catalysts, such as, Fe, Co, Ni, Ru, Rh and/or oxides or carbides thereof. If the catalysts used per se do not have the magnetic property, they can be endowed with the magnetic property by forming composite particles having the magnetic material as the core by means of the currently coating technique as described in the prior art.

There are many methods of preparing composite particles comprising magnetic materials as the core by means of the coating technique, using silicate hydrolysis method, sol-gel method, micro-emulsion method, precipitation method, liquid-phase deposition method, spray-drying method, impregnation method and the like. For the details of the techniques of preparing the catalyst composite particles comprising the magnetic materials as the core by the coating techniques, please refer to the prior art US2005/0116195. In order to save space, the detailed description is omitted here. All the contents disclosed in said patent document are cited by reference.

Typically, when the magnetically assisted slurry bubble column reactor of the present invention is used in the Fischer-Tropsch reaction, the following operating conditions and running parameters are preferably used: the operating temperature is 200-300, e.g., 250; the operating pressure is 1-10 MPa, e.g., 1.5 MPa; $H_2/CO$ feeding volumetric ratio is 0.5-2.0, e.g., 1.0; space velocity (GHSV) is 1000-10000 $h^{-1}$, e.g., 3500 $h^{-1}$; the catalyst particles have a particle size of 10-200 μm, e.g., 20-100 μm; and the catalyst particles are 2-10% of the volume of the reaction system liquid-phase stream.

For the magnetically assisted slurry bubble column reactor of the present invention, since the catalyst particles are kept in a relatively static state when the gas-liquid-solid three-phase reaction materials flows, attrition of the catalyst particles are reduced to the largest extent, and the service life is greatly extended. Moreover, since most of, or even all of the catalyst particles are retained inside the reactor, it is much easier to separate the liquid product from the solid fine particles of the catalyst downstream the reactor, and such a separation step may even be omitted, which undoubtedly simplifies the whole process and contributes to the industrial application in large-scale.

EXAMPLES

The present invention will be further described by the following detailed exemplary embodiments, but these examples do not set any limit to the present invention.

Example 1

The magnetically assisted slurry bubble column reactor is a small-type apparatus in the laboratory scale, and its schematic structure is as shown in FIG. 2. Said apparatus has an inner size of 200 mm and a height of 1500 mm, and 4 coils through which the direct current flows are equally spaced in the periphery of the flanking wall of the reactor along the longitudinal (axial) direction. Thus, there is a stable magnetic field in the downward direction. H2 and CO enter the reactor from the bottom of the reactor via a stream distributor, and the catalyst particles of the Fischer-Tropsch reaction are also fed into the reactor from the bottom via a feeding device. The reaction streams flow upwardly, and eventually exit the reactor via the outlet (including a gas stream outlet and a liquid stream outlet) on the top of the reactor.

In the aforesaid 4 magnetic field generators (coils), the magnetic field intensity generated from the magnetic field generator located on the top of the reactor reach the largest value of 2617.48 A/m; the intensity of the other 3 magnetic field generators is about 689.21 A/m. The aforesaid magnetic field intensity may be adjusted whenever necessary as the operating parameters of the reactor as well as the properties and flowing modes of the reaction streams change to allow the catalyst particles to be always kept in a loose particulate state in the gas-liquid-solid three-phase reaction streams as shown in FIG. 1.

The gas-liquid-solid three-phase reaction streams are subjected to a Fischer-Tropsch synthesis reaction in the aforesaid reactor, in which the operating conditions and running parameters of the reactor are as follows: the operating temperature is 250; the operating pressure is 1.5 MPa; the $H_2$/CO feeding volumetric ratio is 1.0; and space velocity (GHSV) is 3500 $h^{-1}$.

The selected catalyst is the precipitated 100Fe-3Cu-4K-12$SiO_2$ (weight ratio) microspherical ironic Fischer-Tropsch synthesis catalyst prepared by the spray-drying method, and its particle size ranges from 20 to 100 μm. The average particle size is about 75 μm, and the density is about 0.75 g/$cm^3$.

When the reactor starts to run, $H_2$ and CO are preheated to 200 before being fed into the reactor, and the volume ratio of the catalyst in the gas-liquid-solid three-phase reaction streams are about 10% of the liquid-phase volume. After continuous operation of the reactor of 500 hours under the aforesaid operating conditions and running parameters, the average particle size of the catalyst particles is measured to determine the state of abrasion, and the solid content (volumetric percent) in the liquid product is measured to determine the ratio of the catalyst solid particles entrained into the liquid product. In the meanwhile, the conventional method is adopted to measure or calculate the CO conversion and $CH_4$ selectivity.

According to the aforesaid measurement, the average particle size of the catalyst particles is measured with the Mastersizer; the solid content (volumetric ratio) in the liquid product is measured by a drying method or photoelectric method; the CO conversion is determined by detecting the CO content in the gas product; and the $CH_4$ selectivity is calculated by determining the $CH_4$ yield. The experimental result is shown in the following Table 1.

Comparative Example 1

Aside from cancellation of the external magnetic field, the experimental steps in Example 1 are repeated, and the raw materials as well as the operating conditions and running parameters in the Comparative Example 1 are completely the same as Example 1. The experimental result is also shown in the following Table 1.

TABLE 1

| properties | Example 1 | Comparative Example 1 |
| --- | --- | --- |
| Initial average particle size of the catalyst particles (μm) | 75 | 75 |
| After 500 h operation, average particle size of the catalyst particles (μm) | 55 | 15 |
| Solid content in the liquid product (vol %) | 0.97 | 10 |
| CO conversion (%) | 82.4 | 81.7 |
| CH4 selectivity (%) | 3.2 | 3.5 |

It is clearly shown from the experimental result of Table 1 that the abrasion state of the catalyst particles in the magnetically assisted slurry bubble column reactor of the present invention is significantly improved, which undoubtedly will prolong the service life of the catalyst. In the meanwhile, the solid content in the liquid product is also reduced from 10% to 0.97%, which means that the magnetic force generated from the external magnetic field has confined most of the catalyst particles into the reactor, and the difficulty in separating these fine catalyst particles from the liquid product at downstream has been sharply reduced. There is no doubt that it will facilitate the simplification of processing course and the large-scale industrial application. However, as seen from the CO conversion and $CH_4$ selectivity, it seems that the external magnetic field does not have an obvious influence on the Fischer-Tropsch reaction, and at least does not degrade the Fischer-Tropsch reaction progress.

The terms and expression manners in the specification are merely used descriptively but not restrictively, and there is no intention to rule out any equivalents of the represented and described features or constituents thereof when using these terms and modes of expression.

Although several embodiments of the present invention have been represented and described, yet the present invention is not limited to the embodiments as described therein. On the contrary, the person skilled in the art should be aware of any modification and improvement to these embodiments without going against the principle and spirit of the present invention, and the protection scope of the present invention is determined by the attached claims and equivalents thereof.

The invention claimed is:

1. A magnetically assisted slurry bubble column reactor, comprising:
   a slurry bubble column reactor for receiving gas-liquid-solid three-phase reaction streams that flow through the reactor in a flowing direction and include a magnetically responsive catalyst comprising catalyst particles, the flow of the reaction streams imparting a driving force on the catalyst in the flowing direction; and
   a magnetic field generator configured for generating inside the reactor a magnetic field in a direction opposite to the flowing direction of the reaction streams operative to impart a magnetic force on said catalyst that offsets the driving force of the flowing gas-liquid-solid three-phase reaction streams on the catalyst, so as to maintain the catalyst particles in a relatively static state inside the reactor with other reaction streams being in a freely flowing state.

2. The magnetically assisted reactor according to claim 1, wherein said magnetic field generator is at least one coil through which the direct current or alternating current flows and which surrounds said reactor.

3. The magnetically assisted reactor according to claim 1, wherein the magnetic field generator is configured to vary the intensity of said magnetic field along the longitudinal direction of the reactor or along the flowing direction of the reaction streams.

4. The magnetically assisted reactor according to claim 3, wherein the magnetic field generator is configured to generate a magnetic field having a maximum intensity adjacent the top of the reactor.

5. The magnetically assisted reactor according to claim 3, wherein the intensity of said magnetic field is in the range of from 2000 to 7000 A/m at the outlet of the liquid reaction stream, and in the range of from 300 to 2000 A/m in other regions.

6. The magnetically assisted reactor according to claim 1, wherein said magnetically assisted reactor is configured for generating a Fischer-Tropsch reaction between at least a portion of the reaction streams and at least a portion of the catalyst.

7. The magnetically assisted reactor according to claim 1, wherein said catalyst is the particles of magnetic materials or composite particles having the magnetic material as a core.

8. The magnetically assisted reactor according to claim 7, wherein said catalyst is a metal catalyst, metal oxide catalyst, and/or a metal carbide catalyst.

9. The magnetically assisted reactor according to claim 8, wherein said catalyst is Fe, Co, Ni, Ru, Rh and/or oxides or carbides thereof.

10. A method of forming a reaction product, the method comprising:

driving three-phase reaction streams to flow through a slurry bubble column reactor in a flowing direction;

generating a magnetic field inside of the slurry bubble column reactor that is operative to impart a magnetic force upon magnetically responsive catalyst particles inside of the slurry bubble column reactor that suspends the catalyst particles inside of the slurry bubble column reactor in a in a relatively static state as the reaction streams flow past the catalyst particles in the flowing direction; and generating a reaction between at least a portion of the three-phase reaction streams and at least a portion of the catalyst particles as the reactions streams flow past the catalyst particles in said relatively static state to form the reaction product.

11. The method as set forth in claim 10, wherein the step of generating the magnetic field comprises generating the magnetic field so that an intensity of the magnetic field varies along a length of the slurry bubble reactor or along the flowing direction of the reaction streams.

12. The method as set forth in claim 11, wherein the step of generating the magnetic field comprises generating the magnetic field so that the intensity of the magnetic field increases toward an outlet end of the slurry bubble column reactor.

13. The method as set forth in claim 11, wherein the step of generating the magnetic field comprises generating the magnetic field so that the intensity of the magnetic field increases in the flowing direction of the reaction streams.

* * * * *